US009414048B2

(12) United States Patent
Karsch et al.

(10) Patent No.: US 9,414,048 B2
(45) Date of Patent: Aug. 9, 2016

(54) AUTOMATIC 2D-TO-STEREOSCOPIC VIDEO CONVERSION

(75) Inventors: Kevin Robert Karsch, Urbana, IL (US); Ce Liu, Belmont, MA (US); Sing Bing Kang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1278 days.

(21) Appl. No.: 13/315,488

(22) Filed: Dec. 9, 2011

(65) Prior Publication Data

US 2013/0147911 A1    Jun. 13, 2013

(51) Int. Cl.
*H04N 15/00* (2006.01)
*H04N 13/00* (2006.01)
*H04N 13/02* (2006.01)

(52) U.S. Cl.
CPC .................................. *H04N 13/026* (2013.01)

(58) Field of Classification Search
CPC ...................................................... H04N 13/026
See application file for complete search history.

(56) References Cited

U.S. PATENT DOCUMENTS

| 7,027,054 | B1 * | 4/2006 | Cheiky | H04N 5/262 |
| | | | | 345/473 |
| 7,999,844 | B2 | 8/2011 | Richards | |
| 2008/0031327 | A1 * | 2/2008 | Wang | G06T 7/0069 |
| | | | | 375/240.12 |
| 2008/0150945 | A1 | 6/2008 | Wang et al. | |
| 2009/0116732 | A1 * | 5/2009 | Zhou | H04N 13/0029 |
| | | | | 382/154 |
| 2010/0026784 | A1 | 2/2010 | Burazerovic | |
| 2010/0111417 | A1 | 5/2010 | Ward et al. | |
| 2011/0096832 | A1 | 4/2011 | Zhang et al. | |
| 2011/0109720 | A1 | 5/2011 | Smolic et al. | |
| 2013/0034337 | A1 * | 2/2013 | Hefeeda | H04N 5/913 |
| | | | | 386/252 |

OTHER PUBLICATIONS

Ko, et al., "2D-To-3D Stereoscopic Conversion: Depth-Map Estimation in a 2D Single-View Image", SPIE, vol. 6696, 66962A, Aug. 2007, pp. 9.
Kim, et al., "A Stereoscopic Video Generation Method Using Stereoscopic Display Characterization and Motion Analysis", IEEE Transactions on Broadcasting, vol. 54, No. 2, Jun. 2008, pp. 188-197.
Hoiem, et al., "Automatic Photo Pop-up", ACM SIGGRAPH, Journal of ACM Transactions on Graphics (TOG), vol. 24, Issue 3, Jul. 2005, pp. 577-584.
Guttmann, et al., "Semi-automatic Stereo Extraction from Video Footage", IEEE 12th International Conference on Computer Vision (ICCV), Sep. 29-Oct. 2, 2009, pp. 136-142.

(Continued)

*Primary Examiner* — Nhon Diep
(74) *Attorney, Agent, or Firm* — Alin Corie; Cassandra T. Swain; Micky Minhas (57) ABSTRACT

In general, a "Stereoscopic Video Converter" (SVC) provides various techniques for automatically converting arbitrary 2D video sequences into perceptually plausible stereoscopic or "3D" versions while optionally generating dense depth maps for every frame of the video sequence. In particular, the automated 2D-to-3D conversion process first automatically estimates scene depth for each frame of an input video sequence via a label transfer process that matches features extracted from those frames with features from a database of images and videos having known ground truth depths. The estimated depth distributions for all image frames of the input video sequence are then used by the SVC for automatically generating a "right view" of a corresponding stereoscopic image for each frame (assuming that each original input frame represents the "left view" of the stereoscopic image).

20 Claims, 5 Drawing Sheets

(56) References Cited

OTHER PUBLICATIONS

Saxena, et al., "3-D Depth Reconstruction from a Single Still Image", International Journal of Computer Vision, vol. 76, 2007, pp. 16.

Ward, et al., "Depth Director: A System for Adding Depth to Movies", IEEE Computer Graphics and Applications, vol. 31, No. 1, Jan./Feb. 2011, pp. 36-48.

Zhang, et al., "Stereoscopic Video Synthesis from a Monocular Video", IEEE Transactions on Visualization and Computer Graphics, vol. 13, No. 4, Jul./Aug. 2007, pp. 686-696.

Chao-Chung Cheng, Chung-Te Li, and Liang-Gee Chen. A Novel 2D to-3D Conversion System using Edge Information. Consumer Electronics, IEEE Transactions on, 56(3):1739-1745, 2010.

E. Delage, Honglak Lee, and A.Y. Ng. A Dynamic Bayesian Network Model for Autonomous 3D Reconstruction from a Single Indoor Image. In Computer Vision and Pattern Recognition, 2006 IEEE Computer Society Conference on, vol. 2, pp. 2418-2428, 2006.

Fitzgibbon, Y. Wexler, and A. Zisserman. Image-based Rendering using Image-based Priors. In Computer Vision, 2003. Proceedings. Ninth IEEE International Conference on, vol. 2, pp. 1176-1183, Oct. 2003.

Feng Han and Song-Chun Zhu. Bayesian Reconstruction of 3D Shapes and Scenes from a Single Image. In Proceedings of the First IEEE International Workshop on Higher-Level Knowledge in 3D Modeling and Motion Analysis, pp. 12-, Washington, DC, USA, 2003. IEEE Computer Society. Bayesian Reconstruction of 3D Shapes and Scenes from a Single Image.

Tal Hassner and Ronen Basri. Example Based 3D Reconstruction from Single 2D Images. In CVPR workshop on Beyond Patches, 2006.

Sebastian Knorr, Matthias Kunter, and Thomas Sikora. Stereoscopic 3D from 2D video with super-resolution capability. Image Commun., 23:665-676, Oct. 2008.

Kowdle, Y.J. Chang, A. Gallagher, and T.H. Chen. Active Learning for Piecewise Planar 3D Reconstruction. In CVPR11, pp. 929-936, 2011.

Tao Li, Qionghai Dai, and Xudong Xie. An Efficient Method for Automatic Stereoscopic Conversion. In Visual Information Engineering, 2008. VIE 2008. 5th International Conference on, pp. 256-260, 2008.

Beyang Liu, S. Gould, and D. Koller. Single Image Depth Estimation from Predicted Semantic Labels. In Computer Vision and Pattern Recognition (CVPR), 2010 IEEE Conference on, pp. 1253-1260, Jun. 2010.

Ce Liu, J. Yuen, and A. Torralba. Nonparametric scene parsing: Label transfer via dense scene alignment. Computer Vision and Pattern Recognition, IEEE Computer Society Conference on, 0:1972-1979, 2009.

Ce Liu, J. Yuen, and A. Torralba. SIFT Flow: Dense Correspondence across Scenes and its Applications. Pattern Analysis and Machine Intelligence, IEEE Transactions on, 33(5):978-994, May 2011.

K. Moustakas, D. Tzovaras, and M.G. Strintzis. Stereoscopic Video Generation based on Efficient Layered Structure and Motion Estimation from a Monoscopic Image Sequence. Circuits and Systems for Video Technology, IEEE Transactions on, 15(8):1065-1073, 2005.

Aude Oliva and Antonio Torralba. Modeling the Shape of the Scene: A Holistic Representation of the Spatial Envelope. International Journal of Computer Vision, 42:145-175, 2001.

Lai-Man Po, Xuyuan Xu, Yuesheng Zhu, Shihang Zhang, Kwok-Wai Cheung, and Chi-Wang Ting. Automatic 2D-to-3D Video Conversion Technique based on Depth-from-Motion and Color Segmentation. In Signal Processing (ICSP), 2010 IEEE 10th International Conference on, pp. 1000-1003, 2010.

Saxena, Min Sun, and A.Y. Ng. Make3D: Learning 3D Scene Structure from a Single Still Image. Pattern Analysis and Machine Intelligence, IEEE Transactions on, 31(5):824-840, 2009.

Ashutosh Saxena, Sung H Chung, and Andrew Y Ng. Learning Depth from Single Monocular Images. In NIPS 18. MIT Press, 2005.

Oliver Wang, Manuel Lang, Matthias Frei, Alexander Hornung, Aljoscha Smolic, and Markus Gross. Stereobrush: Interactive 2D to 3D Conversion using Discontinuous Warps. In Proceedings of the Eighth Sketch-Based Interfaces and Modeling Symposium, SBIM '11, 2011.

C Wu, J-M Frahm, and M Pollefeys. Repetition-based Dense Single-View Reconstruction. CVPR, pp. 1-8, Mar. 2011.

Chenglei Wu, Guihua Er, Xudong Xie, Tao Li, Xun Cao, and Qionghai Dai. A Novel Method for Semi-automatic 2D to 3D Video Conversion. In 3DTV Conference: The True Vision—Capture, Transmission and Display of 3D Video, 2008, pp. 65-68, 2008.

L Zhang, C. Vazquez, and S. Knorr. 3D-TV Content Creation: Automatic 2D-to-3D Video Conversion. Broadcasting, IEEE Transactions on, pp.(99):1-12, 2011.

Ianir Ideses, Leonid Yaroslavsky, and Barak Fishbain. Real-time 2D to 3D Video Conversion. Journal of Real-Time Image Processing, 2:3-9, 2007. 10.1007/s11554-007-0038-9.

M Kim, S Park, H Kim, and I Artem. Automatic Conversion of Two-dimensional Video into Stereoscopic Video. In Three-Dimensional TV, Video, and Display IV. SPIE, Dec. 2005.

E Rotem, K Wolowelsky, and D Pelz. Automatic video to stereoscopic video conversion. Proc. SPIE, 5664(198):1-9, Mar. 2005.

\* cited by examiner

AUTOMATIC 2D-TO-STEREOSCOPIC VIDEO CONVERSION

BACKGROUND

1. Technical Field

A "Stereoscopic Video Converter" provides various techniques for automatically converting arbitrary 2D video sequences into perceptually plausible stereoscopic or "3D" versions based on estimations of dense depth maps for every frame of the input video sequence.

2. Background Art

In recent years, 3D videos have become increasingly popular. In this context, the term "3D" implies the presentation of stereoscopic video that displays separate corresponding images to the left and right eyes to convey the sense of depth to the viewer. As 3D viewing technology become more widespread, various techniques have been developed for converting monoscopic (2D) videos into 3D. In general, there are two primary classes of 2D-to-3D conversion: semi-automatic and fully-automatic. For semi-automated methods, a user generally guides the conversion process, e.g., by notating depth on various frames, drawing rough occlusion boundaries, or iteratively refining automatic estimates. Semi-automatic methods are interesting because they attempt to improve automatic results with some user intervention; however, most of these methods focus on interfaces for utilizing these methods rather than developing the methods themselves.

Most automatic 2D-to-3D work has focused on obtaining a dense depth map (which can be easily converted to an inverse-depth or disparity map), i.e., a relative depth measurement at each pixel, from which a stereo view can be rendered. One major drawback of these methods is that most require some assumptions about the scene and camera movement. Furthermore, rendering new views using depth maps is an ongoing point of research.

Structure from Motion (SfM), a method for capturing robust 3D positions of points in images, can be used when multiple camera views of a static scene are available. SfM output is generally sparse, but methods exist for obtaining dense point-based reconstructions, and SfM methods have been used to obtain super-resolution stereoscopic videos. When a video sequence is available, various techniques have been used to synthesize dense surface (mesh) reconstructions. Using a bundle optimization framework, methods exist for obtaining temporally consistent depth-maps rather than explicitly reconstructing the 3D scene. It has also been shown that graph-based depth inference from multiple views under second order smoothness priors is tractable and leads to plausible results. In contrast, rather than estimating exact structure as with SfM, other techniques estimate rough planar geometry of a scene for reconstruction and depth estimation, given multiple photographs. With active learning, similar methods have been applied to single images.

Depth from motion parallax is another method for obtaining dense disparity. These methods typically use optical flow techniques to estimate motion parallax, which in turn can be used to hypothesize per-pixel depth. Depth from motion parallax methods can work for dynamic scenes, but are prone to tracking failures e.g., due to noise, textureless surfaces, and sharp motion.

Regardless of how depth is determined, for generating new views (including stereo video), it is generally not enough to know scene depth. The primary issue with depth-based techniques is filling holes of unknown color that are guaranteed to appear during the depth image based rendering (DIBR) process of synthesizing a new view. Holes are most commonly filled using linear interpolation or even Poisson blending (note that such techniques are sometimes based on solving Laplace's equation to minimize gradients in the hole regions). In painting has also been used for hole filling. Further, when sufficient views exist, occlusion information may be found in other frames for use in filling holes. Unfortunately, most of these methods tend to produce unnatural artifacts near occlusion boundaries, thus degrading the appearance of the resulting 3D image or video sequence.

One alternative to the depth-based synthesis of a stereo view is through image warping (homographies). First, camera parameter and motion estimates are made from an input monoscopic video sequence. Then, synthetic stereo viewpoints are defined automatically, and suitable original views are selected and warped to become corresponding stereo frames. Iterative optimization has shown improved results, and real-time variants exist.

Several reconstruction methods for single images of real, unknown scenes have also been proposed. One such method creates convincing reconstructions of outdoor images by assuming an image could be broken into a few planar surfaces. A related technique is adapted to reconstructing indoor scenes. Another technique provides a supervised learning strategy for predicting depth from a single image to create realistic reconstructions for general scenes. Better depth estimates have been achieved by incorporating semantic labels, and more sophisticated learning techniques. Further, if more information about the scene is known, other single-image techniques can be applied, e.g., shape-from-shading, shape-from-texture, 2.1 D sketch, etc. Also, when repetitive structures exist, various techniques can be used to acquire dense depth from a single image.

Various techniques avoiding depth estimation by synthesizing a new view from a collection of known views by ensuring that the local image statistics of the synthesized view match to the local properties of the observed views. Such methods are generally slow, and can take several hours for synthesizing each view. Consequently, the utility of such techniques for converting entire video sequences is rather limited. Furthermore, such methods are subject to unpredictable synthesis in regions that are not visible in any of the original views.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, while certain disadvantages of prior technologies may be noted or discussed herein, the claimed subject matter is not intended to be limited to implementations that may solve or address any or all of the disadvantages of those prior technologies.

In general, a "Stereoscopic Video Converter," as described herein, provides various techniques for automatically converting arbitrary 2D video sequences into perceptually plausible stereoscopic or 3D versions based on estimations of dense depth maps for every frame of the video sequence. Advantageously, and in contrast to conventional techniques, the Stereoscopic Video Converter (SVC) is capable of performing the 2D-to-3D conversion process without requiring user inputs such as manual markups of the video sequence to specify depth, and without requiring an assumption that video scenes are sufficiently static scenes to allow conventional structure from motion and stereo techniques to be applied.

In particular, the automated 2D-to-3D conversion process provided by the SVC includes a process for automated depth estimation via label transfer. This automated depth estimation process begins by providing a database of images and videos having known ground truth depths. Then, given a new image frame (i.e., each individual frame of an input video sequence to be converted from 2D-to-3D), the SVC matches features extracted from each image frame of the input video sequence with features from the images and videos in the database. The SVC then transfers the depths from matched features in the database to each corresponding image frame of the input video sequence as initial depth estimates for each of those frames. These initial estimates are then refined via an iterative process, with the final estimates then being used for view synthesis.

Next, given the estimated depth distributions for all image frames of the input video sequence, the SVC automatically generates the "right" view of a corresponding stereoscopic image for each frame (assuming that each original input frame represents the "left" view of the stereoscopic image). It should be noted that the SVC could alternately generate the "left" view frame by assuming that each original input frame is the "right" view of the stereoscopic image. Thus, for purposes of explanation, the following discussion will simply refer to the original image frame as the "left view" and the automatically generated view as the "right view" of the resulting stereoscopic image. However, in various embodiments, the SVC generates both the left and right views from the input frame and depth information inferred for the input frame.

In one embodiment, the SVC generates the right view for each image frame by using an image saliency process that selectively stretches textures of the features extracted from each image frame when warping the left view to create the right view given the estimated depths of those features. In particular, parts of the image that are less salient (i.e., less important because it is less textured) can be stretched more than those that are more salient (having more texture).

In an alternate embodiment, the SVC generates the right view for each image frame by using image priors to guide an automated reconstruction of the right view. In general, this process reconstructs the right view such that, locally, the reconstructed image looks very similar to some portions of the input left views. However, it should be noted that the left views used for this reconstruction process do not all need to be on the same timeframe. In particular, this alternate embodiment for reconstruction of the right view can use portions of different image frames (i.e., left views) from the input video sequence. In various embodiments, this reconstruction process is extended by coupling depth estimation and view synthesis, so that depth estimation seeds view synthesis while a computed measure of appropriateness of the synthesized view (measured by fitting image priors) guides depth extraction.

In view of the above summary, it is clear that the SVC described herein provides various techniques for automatically converting arbitrary 2D video sequences into perceptually plausible stereoscopic or 3D versions based on estimations of dense depth maps for every frame of the video sequence. In addition to the just described benefits, other advantages of the SVC will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Stereoscopic Video Converter," as described herein, provides various techniques for automatically converting arbitrary 2D video sequences into perceptually plausible stereoscopic or 3D versions based on estimations of dense depth maps for every frame of the video sequence. The Stereoscopic Video Converter (SVC) operates to automatically synthesize a stereo video sequence from a monoscopic video. Advantageously, and in contrast to existing processes, the SVC provides a video conversion solution that does not require multiple viewpoints or non-moving scene objects, and is even applicable to single images.

Another advantage of the SVC is that it provides depth estimation from scenes where photometric consistency constraints (e.g., Structure from Motion (SfM)) are not applicable, though such constraints can be considered in various embodiments of the SVC. Consequently, the SVC can infer depth information for scenes with moving objects, or videos captured with a static or purely rotational cameras. These capabilities are achieved by using a non-parametric "depth transfer" approach that, unlike many existing processes, does not employ a parametric regression for learning depth from scene appearance.

In additional embodiments, the SVC also provides a temporally coherent image-warping technique for rendering new viewpoints given an image and corresponding depth image based rendering (DIBR) that preserves high frequency and highly salient video content that maintains perceptually consistent depth between successive image frames. These techniques are capable of synthesizing stereo video sequences with few to no visual artifacts that will be perceived by a human viewer.

Figure 1:
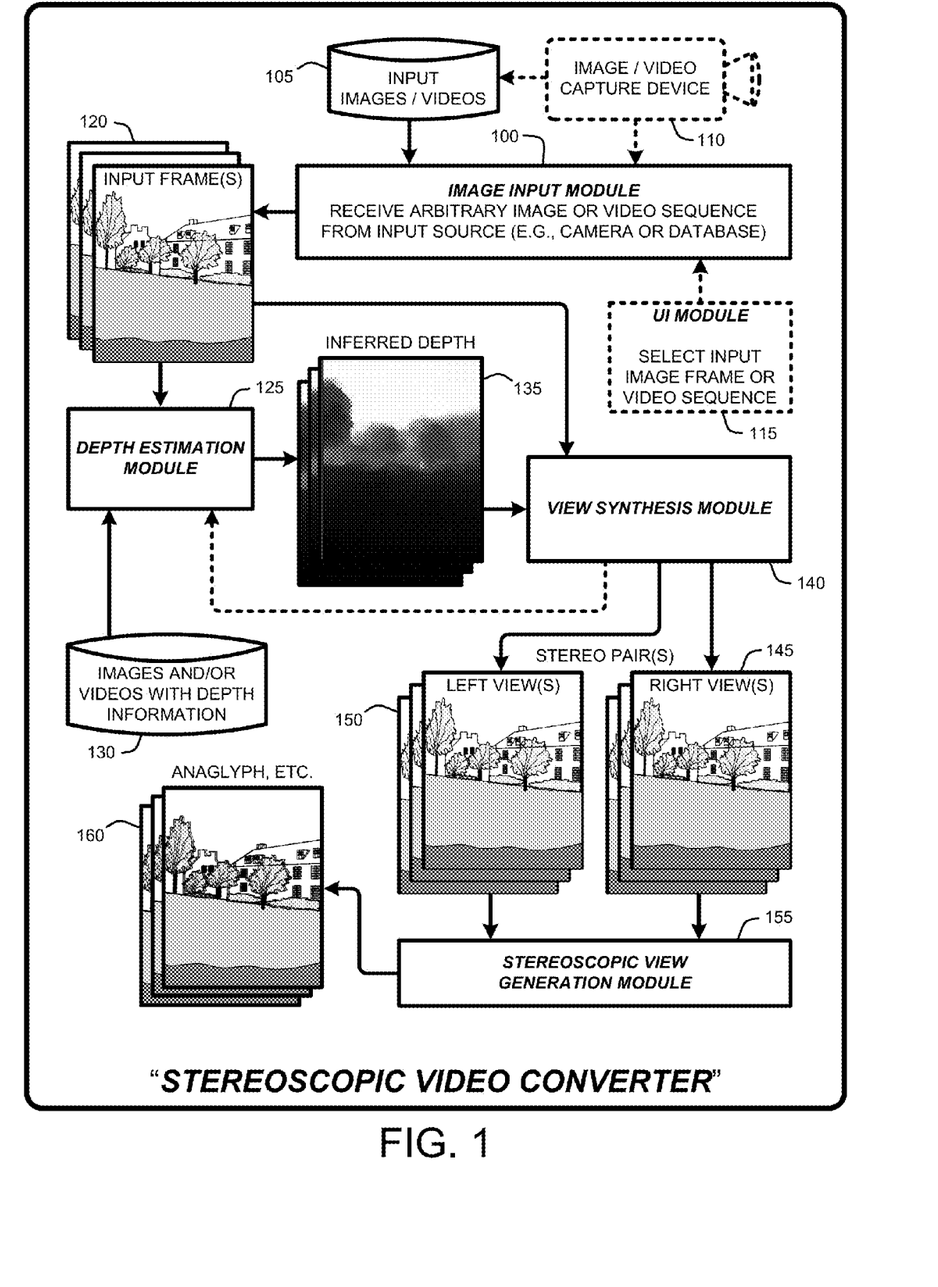
FIG. 1 provides an exemplary architectural flow diagram that illustrates program modules for implementing various embodiments of the Stereoscopic Video Converter (SVC), as described herein.

1.1 System Overview:

As noted above, the SVC provides various techniques for automatically converting arbitrary 2D video sequences into perceptually plausible stereoscopic or 3D versions based on estimations of dense depth maps for every frame of the video sequence. The processes summarized above are illustrated by the general system diagram of FIG. 1. In particular, the system diagram of FIG. 1 illustrates the interrelationships between program modules for implementing various embodiments of the SVC, as described herein. Furthermore, while the system diagram of FIG. 1 illustrates a high-level view of various embodiments of the SVC, FIG. 1 is not intended to provide an exhaustive or complete illustration of every possible embodiment of the SVC as described throughout this document.

In addition, it should be noted that any boxes and interconnections between boxes that may be represented by broken or dashed lines in FIG. 1 represent alternate embodiments of the SVC described herein, and that any or all of these alternate embodiments, as described below, may be used in combination with other alternate embodiments that are described throughout this document.

In general, as illustrated by FIG. 1, the processes enabled by the SVC begin operation by using an image input module 100 to receive an input image or video 105. The input image or video 105 is either pre-recorded, or is recorded or captured using a conventional image or video capture device 110. Note also that a user interface module 115 can be used to select from a library or list of the images or videos 105 or to select an input image from the image or video capture device 110.

The image input module then provides an input frame 120 (or sequential input frames in the case of a video) to a depth estimation module 125. In general, the depth estimation module 125 estimates or infers depth in the input frame 120 in combination with a database prior that represents an average per-pixel depth across some or all of the images in the set of images and/or videos with depth information 130. The resulting inferred depth 135 represents a plausible, though not exact, estimate of the depth of the pixels of the input frame 120. See FIG. 2 and the corresponding discussion below for a more detailed discussion of how the inferred depth 135 is produced by the depth estimation module 125.

Once the depth estimation module 125 has produced the inferred depth 135 for the input frame 120, both the inferred depth and the input frame are provided to a view synthesis module 140. As discussed in further detail in Section 2.4, in various embodiments, the view synthesis module 140 synthesizes a right view 145 (assuming that the input frame 120 is the left view 150) from the input frame and the inferred depth 135 for the input frame. In a related embodiment, the SVC reduces visible artifacts by synthesizing both the right view 145 and the left view 150 from the input frame 120 and the corresponding inferred depth 135.

In yet another related embodiment, the depth estimation process performed by the depth estimation module 125 is coupled with the view synthesis process performed by the view synthesis module 140. This coupling enables an iterative process wherein, following the initial depth estimation to generate the inferred depth 135, the output of the view synthesis module 140 is fed back to the depth estimation module 125 for use in the generation of a new inferred depth 135 that in turn seeds a new view synthesis iteration. This looping process between depth estimation and view synthesis then repeats until either a fixed or user adjustable number of iterations have been performed, or until the depth estimation module 125 converges onto an inferred depth 135 that changes less than some predetermined threshold.

In any case, once the view synthesis module 140 has produced a final output, the resulting left view 145 and the right view 150 are then provided to a stereoscopic view generation module 155 that constructs a visually plausible "3D" or stereoscopic view for each input frame. As discussed in further detail herein, typical formats for stereoscopic views include anaglyphs 160 and various interlaced stereo formats. However, it should be understood that given a left and right view of any scene, the stereoscopic view generation module 155 can implemented to output any conventional stereoscopic format.

Figure 2:
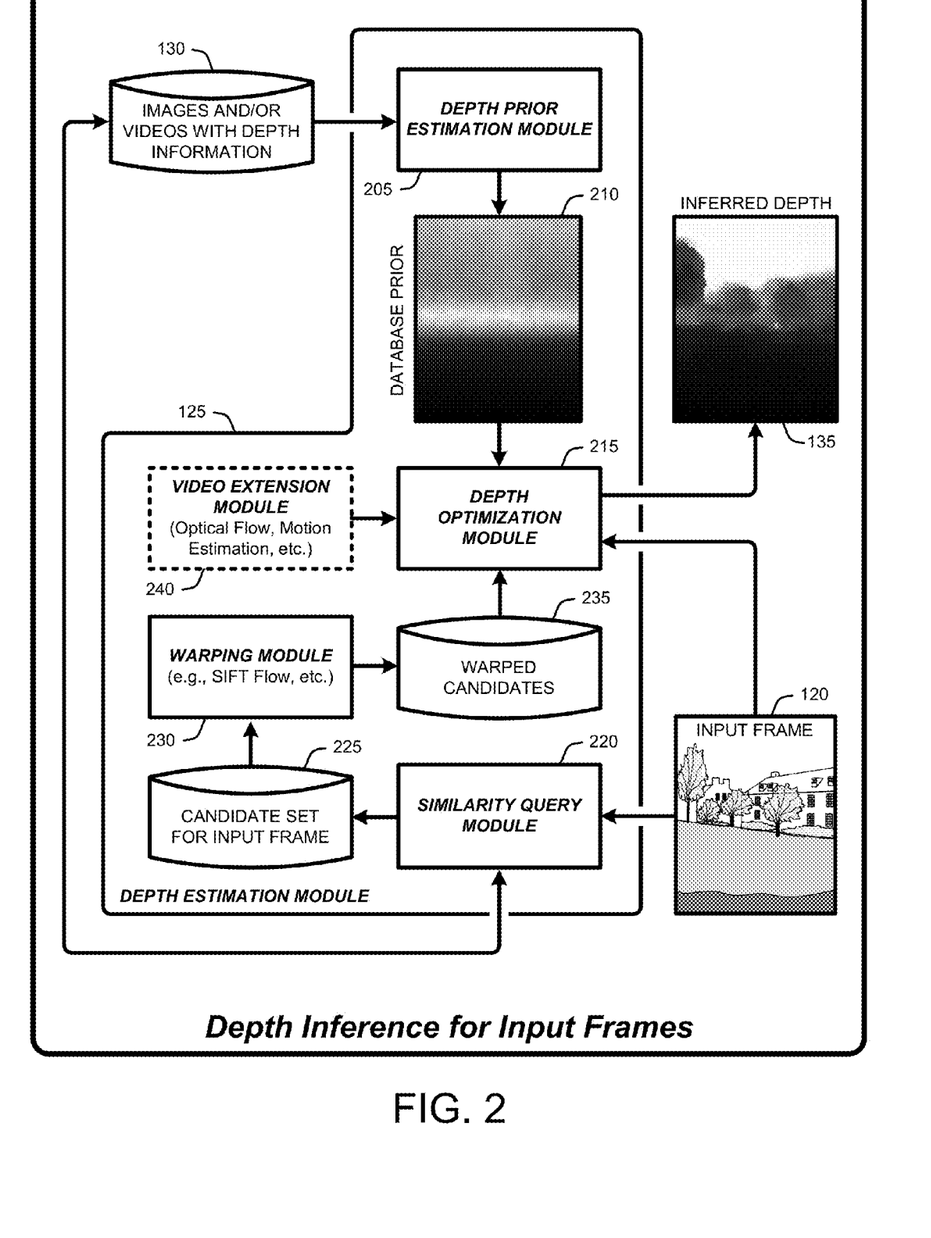
FIG. 2 provides an exemplary architectural flow diagram that expands upon the depth estimation module 125 of FIG. 1 and that further illustrates program modules for implementing various embodiments of the SVC, as described herein.

As noted above, FIG. 2 expands upon the depth estimation module 125 of FIG. 1. In particular, the system diagram of FIG. 2 illustrates the interrelationships between program modules for implementing the depth estimation module and further illustrates various embodiments of the SVC, as described herein. Furthermore, while the system diagram of FIG. 2 illustrates a high-level view of various embodiments of the SVC, FIG. 2 is not intended to provide an exhaustive or complete illustration of every possible embodiment of the SVC as described throughout this document.

In addition, it should be noted that any boxes and interconnections between boxes that may be represented by broken or dashed lines in FIG. 2 represent alternate embodiments of the SVC described herein, and that any or all of these alternate embodiments, as described below, may be used in combination with other alternate embodiments that are described throughout this document.

As noted above, and as illustrated by FIG. 2, the depth estimation module 125 receives inputs that include the input frame 120 and the set of images and/or videos with depth information 130. These inputs are then processed to generate the inferred depth 135 for the input frame 120 as discussed in specific detail herein in Section 2.2 and Section 2.3.

In general, the depth estimation module 125 first processes the set of the set of images and/or videos with depth information 130 using a depth prior estimation module 205 that creates a database prior 210 (also referred to below as "$E_{prior}$") that represents a per-pixel average or mean depth across all images in the set of images and/or videos with depth information. Note also that subsets of images in the set of images and/or videos with depth information 130 can be used to create the database prior 210. For example, rather than creating the database prior 210 using all available images from the set of images and/or videos with depth information 130, similar scenes, such as, for example, images or videos of houses surrounded by trees can be used to create a specific database prior that will then be used in combination with similar input frames 120 to generate the corresponding inferred depth 135.

It should be understood that the SVC does not recreate the database prior 210 every time that a new input frame 120 is processed. The depth prior estimation module 205 creates one or more database priors 210 from the set of images and/or videos with depth information 130 as a pre-processing step. Those database priors 210 are then stored and made available for use as an initial estimate or prior for generating the inferred depth 135, as discussed in further detail below.

More specifically, given set of images and/or videos with depth information 130 (also referred to below as the "image database"), the depth transfer approach provided by the SVC operates in three stages, as illustrated by FIG. 2. First, given the image database with known per-pixel depth and an input frame 120, the SVC uses a similarity query module 220 to find a candidate set 225 of images that are similar to the input frame. Note that a maximum number of candidates can be either pre-specified or set by the user. This candidate set 225, also referred to herein as "candidate images" represent images in the database that are "similar" to the current input frame being processed. Next, a warping module 230 applies a warping procedure (e.g., SIFT Flow, etc.) to the candidate images and corresponding depths to align each of the candidates with the input frame 120 to create a set of warped candidates 235.

Finally, a depth optimization module 215 receives as input the database prior, 210, the input frame 120, and the set of warped candidates 235. Given these inputs, the depth optimization module 215 then performs an iterative optimization process that intelligently interpolates and smoothes the depth values of the warped candidates 235 to produce the inferred depth 135 for the pixels of the input image. Note also that in the case of video inputs with successive image frames that are closely related, a video extension module 240 is used in combination with the depth optimization module 215 to ensure perceptual continuity of the inferred depth information between successive image frames of the video sequence. Specific details of the video extension process for estimating depth in video sequences are provided in Section 2.2.4.

2.0 Operational Details of the Stereoscopic Video Converter:

The above-described program modules are employed for implementing various embodiments of the SVC. As summarized above, the SVC provides various techniques for automatically converting arbitrary 2D video sequences into perceptually plausible stereoscopic or 3D versions based on estimations of dense depth maps for every frame of the video sequence. The following sections provide a detailed discussion of the operation of various embodiments of the SVC, and of exemplary methods for implementing the program modules described in Section 1 with respect to FIG. 1 and FIG. 2. In particular, the following sections provides examples and operational details of various embodiments of the SVC, including: an operational overview of the SVC; non-parametric depth estimation; depth inference implementation details; automatic stereoscopic view synthesis; and various extensions and additional embodiments of the SVC.

2.1 Operational Overview:

As noted above, the SVC-based processes described herein provide various techniques for automatically converting arbitrary 2D video sequences into perceptually plausible stereoscopic or 3D versions based on estimations of dense depth maps for every frame of the video sequence. In general, these processes infer a stereoscopic video from a monocular video. For each frame in the original video, the SVC infers right synthetic stereo views $R=\{R_1, \ldots, R_n\}$, given the entire input video sequence of left views $L=\{L_1, \ldots, L_n\}$, where n is the number of video frames. Note also that left views could be inferred from right view as input, if desired. One natural extension to this process is to infer geometry (i.e., estimates of relative depth measurements) along with the synthesized view. These per-pixel depth estimates are denoted herein as $D=\{D_1, \ldots, D_n\}$, which correspond to left image sequence L. More formally, the SVC finds R and D that maximizes the posterior probability $P(R,D|L)$. By the product rule of probability, this can be written as:

$$P(R,D|L)=P(D|L)P(R|D,L) \qquad \text{Equation (1)}$$

which allows the SVC to model the distribution of depth given the left images ($P(D|L)$), and also the distribution of right images given the left image sequence and corresponding depths ($P(R|D, L)$). In summary, the SVC first estimates depth from the input sequence, and subsequently uses the input video and estimated depth to synthesize a stereoscopic video. An overview of this process is illustrated by FIG. 1, as discussed above.

To maximize the posterior probability, the SVC uses an algorithm that poses each stage of the process as a continuous optimization problem. As discussed in Section 2.2, the probability $P(D|L)$ is formally defined in combination with a discussion of how to maximize this probability (i.e., depth inference) using a non-parametric, label transfer approach, with a discussion of the implementation details for this process provided in Section 2.3. The model of $P(R|D, L)$ (i.e., right view synthesis assuming a left view input) is then described in Section 2.4.

2.2 Non-Parametric Depth Estimation:

The SVC provides various techniques for using non-parametric learning techniques to infer depth from a video via a process that imposes no requirements on the video, such as motion parallax or sequence length, and can even be applied to a single image. Section 2.2.1 first describes depth estimation as it applies to single images, followed by a discussion of how these depth estimation techniques extend to videos (see Section 2.2.4) in a manner that allows the SVC to provide coherent depth estimation over time for the input video sequence.

In general, as discussed above with respect to FIG. 2, the basic pipeline for estimating depth from a single image begins with finding matching candidates for the input image frame from the set or database of images and/or videos with depth information (see Section 2.2.1). This candidate set is then warped candidates to match the structure of the input image (see Section 2.2.2). The SVC then uses a global optimization procedure to interpolate the warped candidates (Equation 2), producing per-pixel depth estimates for the input image. An extension to this process for handling video sequences is then described in Section 2.2.4.

2.2.1 Depth Estimation Via Label Transfer:

As is known to those skilled in the art, arbitrary scenes can be semantically labeled using a non-parametric learning paradigm. For example, given an unlabeled input image and a database with known per-pixel labels (e.g., sky, car, tree, window, etc.), conventional labeling techniques operate to select similar scenes from the database and to intelligently transfer the known labels to the input image based on SIFT features. Note that as is well known to those skilled in the art, "scale-invariant feature transforms" or "SIFT" are provided by an algorithm in computer vision that detects and describes local features in images. The SVC leverages such techniques to provide the stereoscopic rendering techniques described herein by showing how label transfer can be applicable in domains other than semantic labeling.

As noted above, the SVC uses a database of existing images having depth information. In particular, the pixel information for images in the database is discussed herein using notation such as "RGBD", where the notation RGBD indicates an image with 4 channels: three standard color channels of the RGB space, as well as depth (D). Note also that the SVC is not limited to the use of the RBG color space, and that any desired color space can be used given the techniques described herein. A wide variety of techniques can be used to construct this database.

For example, in a tested embodiment, consumer-grade image capture or range scanners such as the Microsoft° Kinect™ were used with to capture images and video sequences with integral depth information for creating the database of images with depth information. However, it should be understood that there are many existing techniques that can be used to construct or obtain this database without departing from the intended scope of the stereoscopic rendering techniques described herein. In fact, many existing databases of images with depth information are currently available from a variety of sources.

Given this database, the depth transfer approach provided by the SVC operates in three stages, as illustrated by FIG. 2, as discussed above. First, given an image database with known per-pixel depth and an input image, the SVC finds "candidate images" in the database, which are "similar" to the input image (from the input video sequence). Then, a matching procedure (e.g., SIFT Flow, etc.) is applied to the candidate images and depths to align them with the input frame. Finally, an optimization procedure is used to intelligently interpolate and smooth the warped candidate depth values, which results in the inferred depth for the pixels of the input image.

In general, the SVC operates on the assumption that scenes with similar semantics and depths will have roughly similar per-pixel depth values when densely aligned. Of course, not all of these initial estimates will be correct. Consequently, as noted above, the SVC finds multiple candidate images for each input image, and then uses these multiple candidates to refine and interpolate the initial estimates using a global optimization process that infers a plausible per-pixel depth estimate for the input frame.

2.2.2 Candidate Matching and Warping:

With both the database and each input image, the SVC computes high level image features for each image or frame of video in the database as well as the input image. As discussed in Section 2.3.1, in various embodiments, the SVC uses GIST and optical flow based techniques for computing these high-level features. Note that GIST techniques provide a collection of image features that summarize the most important characteristics of an input image. The SVC then selects the top K matching frames from the database. Note that in various embodiments, the SVC ensures that each video in the database contributes no more than one matching frame for any particular input frame. This embodiment forces matching images to be from differing viewpoints, allowing for greater variety among matches. As noted above, these matching images from the database are referred to candidate images, and their corresponding depths are referred to as candidate depths.

Because the candidate images from the database are selected to match the input image closely in feature space (which include GIST features), it is assumed that the overall semantics of the scene are roughly similar, and that the distribution of depth is comparable among the input and candidates. However, ideally, a direct pixel-to-pixel correspondence between the input and all candidates is desired, so as to limit the search space when inferring depth from the candidates.

This pixel-to-pixel correspondence is achieved through SIFT flow, which matches per-pixel SIFT features to estimate dense scene alignment. Using SIFT flow, the SVC estimates warping functions $\psi_i$, $i \in \{1, \ldots, k\}$ for each candidate image. In general, these warping functions map pixel locations from a given candidate's domain to pixel locations in the input's domain. Note that the warping functions can be multivalued (one-to-many), and are not necessarily surjective.

More specifically, SIFT flow warping is performed by first calculating SIFT features for each pixel in two input images. These features are matched in a one-to-many fashion. This matching defines an operator $\psi$, which when applied to the first input image, maps pixel locations to their corresponding matching locations in the second input image. This can be used, for example, to achieve dense scene alignment.

2.2.3 Depth Optimization:

In general, each warped candidate depth is assumed to provide a rough approximation to the depth of the input. In fact, it has been observed that semantically similar candidate images and dense scene alignment can be obtained through SIFT flow. While the warped depth could be used as the final inferred depth, if desired, the warped candidates may still contain inaccuracies and are often not spatially smooth. Consequently, more accurate depth estimates are achieved by the SVC by employing an optimization process that considers all of the warped candidates, and then uses this information to synthesize the most likely depth for the input image.

In particular, denoting L as the input (left) image and D as the depth values to be inferred, the SVC acts to minimize the negative log-posterior P(D|L), as illustrated by Equation (2):

$$-\log(P(D \mid L)) = E(D) = \sum_{i \in pixels} E_{transfer}(D_i) + \alpha E_{smooth}(D_i) + \beta E_{prior}(D_i) + \log(Z) \quad \text{Equation (2)}$$

where Z is the normalization constant of the probability, and $\alpha$ and $\beta$ are variable parameters. Note that in various tested embodiments, values on the order of $\alpha=10$ and $\beta=0.5$ were observed to provide acceptable results. However, these values may be adjusted, if desired. The objective contains three terms: data ($E_{transfer}$), spatial smoothness ($E_{smooth}$), and database prior ($E_{prior}$).

The data term measures how close the inferred depth, D, is to each of the warped candidate depths, $\psi_j(C^{(j)})$. This distance measure is defined by $\phi$, a robust error norm. Note that in a tested embodiment, the SVC used an approximation to the L1 norm, $\phi(x)=\sqrt{x^2+\epsilon}$, however, other error norms can be used, if desired. The data term is defined as:

$$E_{transfer}(D_i) = \sum_{j=1}^{K} w_i^{(j)} [\Phi(D_i - \psi_j(c_i^{(j)})) + \gamma(\Phi(\nabla_x D_i - \psi_j(\nabla_x C_i^{(j)})) + \Phi(\nabla_y D_i - \psi_j(\nabla_y C_i^{(j)})))] \quad \text{Equation (3)}$$

where $w_i^{(j)}$ is a confidence measure of the accuracy of the $j^{th}$ candidate's warped depth at pixel i (see Section 2.3 for a further discussion of this point) and K is the total number of candidates. The SVC measures not only absolute differences, but also relative depth changes, i.e., gradient depth. The second and third terms of Equation (3) model the gradient depth differences with the inferred depth gradients, weighted by $\gamma$ (where a value of approximately $\gamma=0.5$ was used, though this value can be adjusted, if desired). Note that these terms allow for more accurate intra-object depth inference.

Spatial smoothness of depth is enforced, especially in regions where the input image is also spatially smooth. Thus, the SVC penalizes depth gradients, weighted by a function of the derivative of the input image:

$$E_{smooth}(D_i) = s_{x,i}\phi(\nabla_x D_i) + s_{y,i}\phi(\nabla_y D_i) \quad \text{Equation (4)}$$

Soft thresholds of the image gradients (using a sigmoidal function) are used, defining $s_{x,i}=1-1/(1+e^{-100(\|\nabla_x L_i\|-0.05)})$ and $s_{y,i}=1-1/(1+e^{-100(\|\nabla_y L_i\|-0.05)})$. Assumptions from the database are also incorporated that help to guide the inference when pixels have little or no influence from other terms (due to weights w and s):

$$E_{prior}(D_i) = \phi(D_i - \mathcal{P}_{i,i}) \quad \text{Equation (5)}$$

where the prior, $\mathcal{P}$, is computed by averaging all depth images in the database (or sets of similar image frames in the database).

Thus, it can be seen that the above-described optimization has three parameters, including α, β, and γ, which control the weightings of spatial smoothness, prior, and gradient depth, respectively. The number of candidate images is controlled by K.

2.2.4 Extending Depth Estimation to Video:

The depth estimation framework can also infer temporally consistent depth for sequences of frames (videos) by modifying the matching and optimization procedures discussed in Section 2.2. In general, it would be possible to generate depth on a frame-by-frame basis without incorporating temporal information. However, disregarding this information will likely lead to visual discontinuities over time. Therefore, in various embodiments, the SVC performs the same candidate matching and warping scheme as in the single image case for each frame of the video sequence, and then augments the original objective function (Equation 2) with temporal information to improve depth estimation and to maintain coherence throughout the sequence. With this modification, the objective function becomes:

$$E_{video}(D) = E(D) + \sum_{i \in pixels} v E_{coherence}(D_i) + \eta E_{motion}(D_i) \quad \text{Equation (6)}$$

where $E_{coherence}$ achieves temporal smoothness, and $E_{motion}$ uses motion cues to better estimate the depth of moving objects. The weights v and η are used to balance the relative influence of each term. Note that in tested embodiments, values of approximately v=10 and η=5 were used, though these values can be adjusted, if desired.

Temporal coherence is modeled by first computing per-pixel optical flow for each pair of consecutive frames in the video using conventional optical flow-based techniques. As is well known to those skilled in the art, optical flow defines a mapping from one frame to the next, indicating where pixels map to in the subsequent frame. In addition to these optical flow techniques, a "flow gradient," $\nabla_{flow}$, is defined as a linear operator which returns the change in the flow between corresponding pixels, with the coherence term modeled as:

$$E_{coherence}(D_i) = s_{t,i} \phi(\nabla_{flow} D_i) \quad \text{Equation (7)}$$

Each term is weighted by a measure of flow confidence, where $s_{t,i} = 1 - 1/(1 + e^{-100(\|\nabla_{flow} L_i\| - 0.05)})$, which intuitively is a soft threshold on the reprojection error of the optical flow on the input video sequence. Minimizing the weighted flow gradients has the effect of temporally smoothing inferred depth in regions where optical flow estimates are accurate.

To improve the depth of moving objects, the SVC uses a motion segmentation technique (as discussed in further detail in Section 2.3) to detect moving objects in the video, and constraints the depth of these objects to be consistent with the point in which the moving objects contact the floor (or ground, road, etc.). Denoting m as a binary motion segmentation mask, and $\mathcal{M}$ as the depth in which connected components in the segmentation mask contact the floor, the motion term is then defined as:

$$E_{motion}(D_i) = m_i \phi(D_i - \mathcal{M}_{i}) \quad \text{Equation (8)}$$

As discussed in Section 2.3, the SVC minimizes the objective function using iteratively reweighted least squares, which allows $\mathcal{M}_i$ to be recomputed prior to each iteration.

2.3 Depth Inference Implementation Details:

The following paragraphs describe relevant details for implementing various embodiments of the depth inference system described herein. However, it should be understood that the implementation techniques described below are provided only for purposes of explanation, and are not intended to be an exhaustive discussion of the many ways in which the SVC may be implemented. It should be noted that in various embodiments, any depth information estimated or inferred for input image frames is user editable or user adjustable.

2.3.1 Feature Descriptors for Matching Candidate Images:

As noted above, in order to find candidate images which match the input image/sequence semantically and in terms of depth distribution, the SVC uses a combination of GIST features and features derived from optical flow. To create flow features for a video, the SVC first computes optical flow, using conventional techniques, for each pair of consecutive frames, which defines a warping from frame i to frame i+1. If the input is a single image, or the last image in a video sequence, this warping is considered to be an "identity warp." Then, the SVC segments the image into b×b uniform blocks, and computes the mean and standard deviation over the flow field in each block, for both components of the flow (horizontal and vertical warpings), and for the second moments as well (each component squared). This leads to 8 features per block, for a total of $8b^2$ features per image. Note that in various tested embodiments, a value of approximately b=4 was used, though this value can be adjusted, if desired.

To determine the matching score between two images, the SVC takes a linear combination of the difference in GIST and optical flow features described above. Denoting $G_1$, $G_2$ and $F_1$, $F_2$ as the GIST and optical flow feature vectors for two images respectively, where the matching score is defined as:

$$(1-\omega)\|G_1 - G_2\| + \omega \|F_1 - F_2\| \quad \text{Equation (9)}$$

where ω=0.5 in various tested embodiments of the SVC, though this value can be adjusted, if desired.

2.3.2 Non-Uniform Candidate Depth Weights:

During optimization, Equation (3) is used to ensure that the inferred depth is similar to each of the K warped candidate depths. However, some of the candidate depth values will be more reliable than others, and this reliability is modeled with a confidence weighting for each pixel in each candidate image (e.g., $w_i^{(j)}$ is the weight of the $i^{th}$ pixel from the $i^{th}$ candidate image). These weights are computed by comparing per-pixel SIFT descriptors, obtained during the SIFT flow computation, of both the input image and the candidate images:

$$w_i^{(j)} = 1 - \frac{1}{1 + e^{-10(\|S_i - \psi_j(S_i^{(j)})\| - 0.5)}} \quad \text{Equation (10)}$$

where $S_i$ and $S_i^{(j)}$ are the SIFT feature vectors at pixel i in candidate image j. Note that the candidate image's SIFT features are computed first, and then warped using the warping function ($\psi_j$) calculated with SIFT flow.

2.3.3 Image-Dependent Smoothness Weights:

The SVC uses a spatial regularization term for optimization. However, the smoothness is not applied uniformly to the inferred depth, as there is some relation between image appearance and depth. Therefore, it is assumed that regions in the image with similar texture are likely to have similar, smooth depth transitions, and that discontinuities in the image are likely to correspond to discontinuities in depth. This assumption is enforced with a per-pixel weighting of the spatial regularization term such that this weight is large where the image gradients are small, and vice-versa, as in Equation (4).

2.3.4 Motion Estimation:

The SVC is generally concerned with videos that come from a static viewpoint, and leverages this fact to detect and segment moving objects in the scene. First, to account for dynamic exposure changes throughout the video, the SVC finds the darkest (in terms of intensity) image in the sequence, and performs image-histogram equalization on all other frames in the video. Note that the darkest image is used so as to not enhance pixel noise in dark images if a brighter image is instead used as the reference. Next, the SVC computes the optical flow for each pair of consecutive frames, and estimates the background image ($B_i$) by taking a weighted average (based on flow) of the input sequence, as illustrated by Equation (11):

$$B_i = \frac{\sum_{k=1}^{n} L_{i,k} f_{i,k}}{\sum_{k=1}^{n} f_{i,k}} \quad \text{Equation (11)}$$

where $L_{i,k}$ and $f_{i,k}$ are the $i^{th}$ pixel from the $k^{th}$ video frame of the input image and flow weights respectively. The flow weights are computed so that pixels with high motion (large optical flow magnitude) have less weight in the average, such that $f_{i,k} = 1 - 1/(1+e^{-100(\|flow_{i,k}\|-0.2)})$ where $\|flow_{i,k}\|$ is the optical flow magnitude at pixel i and frame k. In alternate embodiments, other background detection techniques such as median filtering can be used to detect the background. However, it has been observed that median filtering produces results that are not quite as good.

Once the background has been computed, the SVC computes the probability that a given pixel is "in motion" by testing its relative different from the background, weighted by the magnitude of the flow, and threshold the following probability:

$$m_{i,k} = \begin{cases} 1, & \text{if } \|flow_{i,k}\| \frac{|L_{i,k} - B_i|}{B_i} > t \\ 0, & \text{otherwise} \end{cases} \quad \text{Equation (12)}$$

where t is an adjustable threshold. Note a value of approximately t=0.01 was used for various embodiments of the SVC, though this value can be adjusted, if desired. Relative differences (i.e., division by the background pixels) are used so as to not bias the estimates with brighter pixels. This "segmentation mask" is used in Equation (8) to improve depth estimates for moving objects in the above-described optimization.

2.3.5 Minimizing the Objective Function:

In order to minimize the objective function (Equations (2) and (6)), the SVC uses iteratively reweighted least squares (IRLS). However, it should be understood that while IRLS was used because it is a fast alternative for solving unconstrained, nonlinear minimization problems, other mathematical constructs exist for addressing such problems, and can be adapted for use by the SVC. In general, IRLS works by approximating the objective by a linear function of the parameters, and solving the system by minimizing the squared residual (e.g., with least squares).

In the general case of videos, the size of this system can be very large, although this system will be sparse because of the limited number of pairwise interactions in the optimization. Still, given modern hardware limitations, these types of systems are not directly solvable. Consequently, the SVC uses an iterative method to solve the least squares system at each iteration of the IRLS procedure. In various tested embodiments, a preconditioned conjugate gradient (PCG) process was used for this purpose.

Because the SVC uses iterative optimization, starting from an good initial estimate is helpful for quick convergence with fewer iterations. It has been observed that initializing with some function of the warped candidate depths provide a reasonable starting point. Therefore, in various tested embodiments, the median value (per-pixel) of all candidate depths was used for initialization purposes, though it should be understood that other initializations may also be used without departing from the intended scope of the ideas described herein.

2.4 Automatic Stereoscopic View Synthesis:

With depth estimated for the video sequence (or single image) as discussed above, the SVC can perform depth image based rendering (DIBR) to synthesize a new view for each frame for creating a stereoscopic display for each frame. A typical strategy for DIBR is to simply reproject pixels based on depth values to a new, synthetic camera view. However, such methods are susceptible to large "holes" at disocclusions. Much work has been done to fill these holes using conventional techniques, but visual artifacts still remain in the case of general scenes.

Therefore, the SVC uses a new extension to a recent DIBR technique, that is only applicable to single images, which uses image warping to overcome problems such as disocclusions and hole filling. This conventional DIBR technique is based on the general idea that people are less perceptive to errors in low saliency regions, and thus disocclusions are covered by "stretching" the input image where people are less likely to notice artifacts. In particular, this conventional DIBR technique receives a single image and per-pixel disparity values as an input and, and intelligently warps the input image based on the disparity such that highly salient regions remain unmodified.

In contrast, the SVC extends the conventional DIBR technique to handle video sequences as an input rather than just a single image. This extension is illustrated by FIG. 3, which provides an exemplary architectural flow diagram that expands upon the view synthesis module 140 of FIG. 1 and that further illustrates program modules for implementing various embodiments of the SVC, as described herein.

Figure 3:
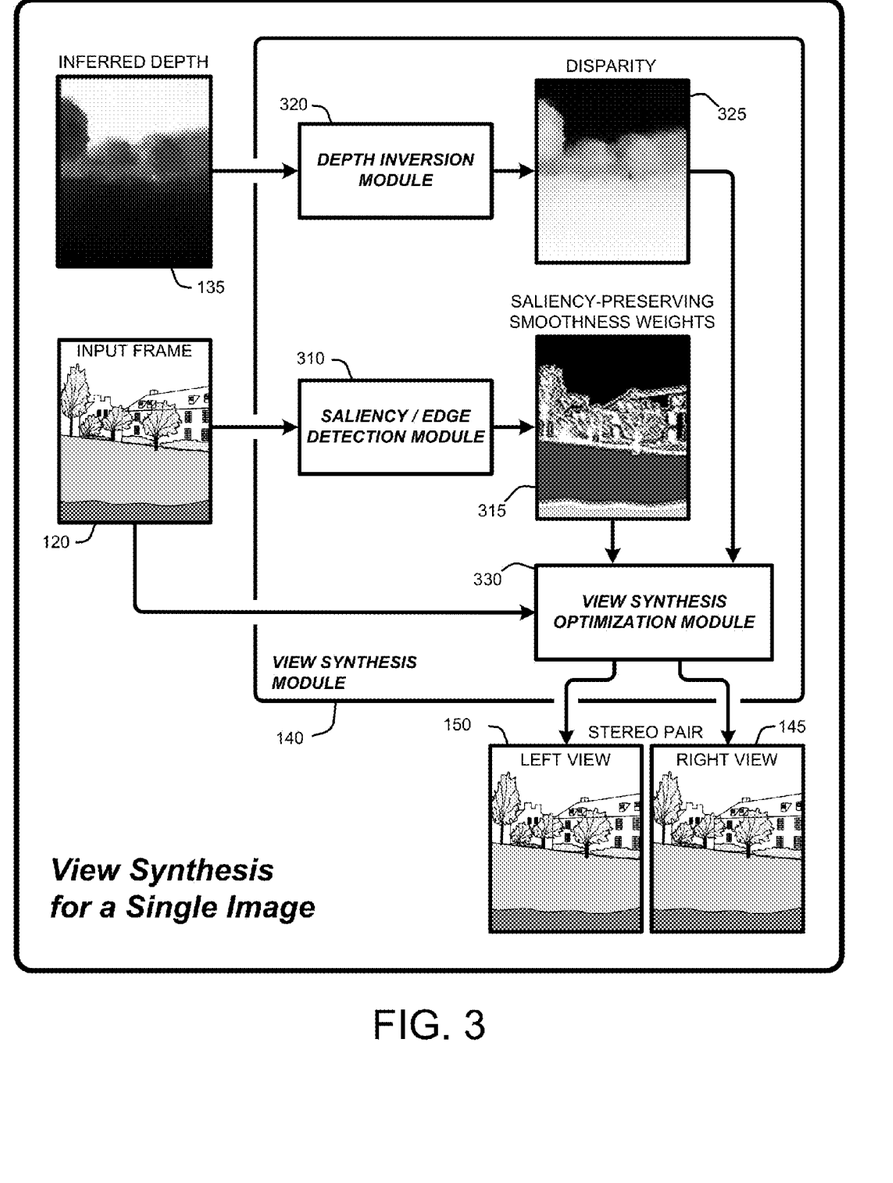
FIG. 3 provides an exemplary architectural flow diagram that expands upon the view synthesis module 140 of FIG. 1 and that further illustrates program modules for implementing various embodiments of the SVC, as described herein.

In general, as illustrated by FIG. 3, the inferred depth 135 is provided to a depth inversion module 320 component of the view synthesis module 140. The depth inversion module inverts the inferred depth 135 to produce a disparity 325 for the input frame 120. The input frame 120 is provided to a saliency/edge detection module 310 component of the view synthesis module 140. As discussed in further detail below, the saliency/edge detection module 310 processes the input frame 120 to compute saliency-preserving smoothness weights 315. These weights enable the SVC to maintain spatial and temporal coherence while also ensuring that highly salient regions remain perceptually intact during the view warping performed by a view synthesis optimization module 330 component of the view synthesis module 140. As a result, video sequences processed by the view synthesis module 140 maintain spatial and temporal coherence in the synthesized right view 145 and left view 150. Note also that as discussed above, in various embodiments, the input frame 120 can be used as the left view 150.

In particular, given an input image and depth values, the SVC first inverts the depth to convert it to disparity, and then scales the disparity by the maximum disparity value:

$$W_0 = \frac{W_{max}}{D + \varepsilon'} \qquad \text{Equation (13)}$$

where $W_0=\{W_1, \ldots, W_n\}$, $D=\{D_1, \ldots, D_n\}$ is the initial disparity and depth, respectively, for each of the n frames of the input, and $W_{max}$ is an adjustable parameter that modulates how much objects "pop-out" from the screen when viewed with a stereoscopic device. Increasing the value of $W_{max}$ enhances the "3D" effect, but can also cause eye strain or problems with fusing the stereo images if set too high.

Next, to implement a saliency-preserving warp (which in turn defines the left and right newly synthesized views), the SVC minimizes the second term of the log posterior, modeled as:

$$-\log\left(P(R|D,L)\right) = Q(W) = \sum_{i \in pixels} Q_{data}(W_i) + Q_{smooth}(W_i) \qquad \text{Equation (14)}$$

$$Q_{data}(W_i) = l_i(W_i - W_{0,i})^2$$

$$Q_{smooth}(W_i) = \lambda(s_{x,i}\|\nabla_x W_i\|^2 + s_{y,i}\|\nabla_y W_i\|^2) + \mu s_{t,i}\|\nabla_{flow} W_i\|^2$$

where $l_i$ is a weight based on image saliency and initial disparity values that constrains disaparity values corresponding to highly salient regions and very close objects to remain unchanged, and is set to $$l_i = \frac{w_{0,i}}{w_{max}} + 1/(1 + e^{-500(\|\nabla L_i\|-0.01)}).$$

The $Q_{smooth}$ term contains the same terms as in the spatial and temporal smoothness functions provided above (see Equations (4) and (7), respectively), and $\lambda$ and $\mu$ control the weighting of these smoothness terms in the optimization. Note that in tested embodiments, both $\lambda$ and $\mu$ were set to a value of 10, although these values can be adjusted, if desired. Given this formulation, the SVC ensures spatial and temporal coherence while also ensuring that highly salient regions remain perceptually intact during view warping.

After optimization, the SVC divides the disparities by two (i.e., $$W \leftarrow \frac{W}{2}),$$

and use these halved values to render the input frame(s) into two new views (corresponding to the stereo left and right views) that generally produces larger numbers of smaller artifacts. Note that the SVC can also use other methods, such as only rendering one new frame with larger disparities while using the input frame as the other half of the stereo pair; however, such techniques tend to produce relatively fewer, but larger, artifacts. In general, people tend to be less perceptive of many small artifacts when compared with few large artifacts. For rendering, the SVC uses a conventional anisotropic pixel splatting method that "splats" input pixels into the new view (based on W) as weighted, anisotropic Gaussian blobs.

Finally, given the two synthesized views (or a synthesized right view given an input left view), the SVC can convert to any desired 3D viewing format, including, but not limited to, anaglyph or interlaced stereo formats. In various tested embodiments, the SVC used the anaglyph format since cyan/red anaglyph glasses are currently more widespread than polarized/autostereoscopic displays (used with interlaced 3D images). To reduce eye strain, the SVC also shifts the left and the right images such that the nearest object has zero disparity, making the nearest object appear at the display surface, and all other objects appear behind the display. This is known as the "window" metaphor.

2.4.1 Alternate Texture-Based Stereoscopic View Synthesis:

As discussed above, in various embodiments, saliency-preserving smoothness weights are used to maintain spatial and temporal coherence while also ensuring that highly salient regions remain perceptually intact during the view warping. In an alternate embodiment, the SVC instead uses texture patches as "image priors" that are extracted from the input frame or frames of the input video sequence to maintain coherence between frames during view synthesis.

In general, this additional embodiment joins together the depth estimation and view synthesis stages described above, and jointly maximize the probabilities in Equation (1) rather than computing these probabilities separately. More specifically, this embodiment uses texture priors extracted from each frame of the input video sequence to ensure that the synthesized views do not contain regions that differ significantly from regions that are observed in the input video. Note that either or both a texture patch size and a maximum number of texture patches can be either pre-specified or set by the user.

Figure 4:
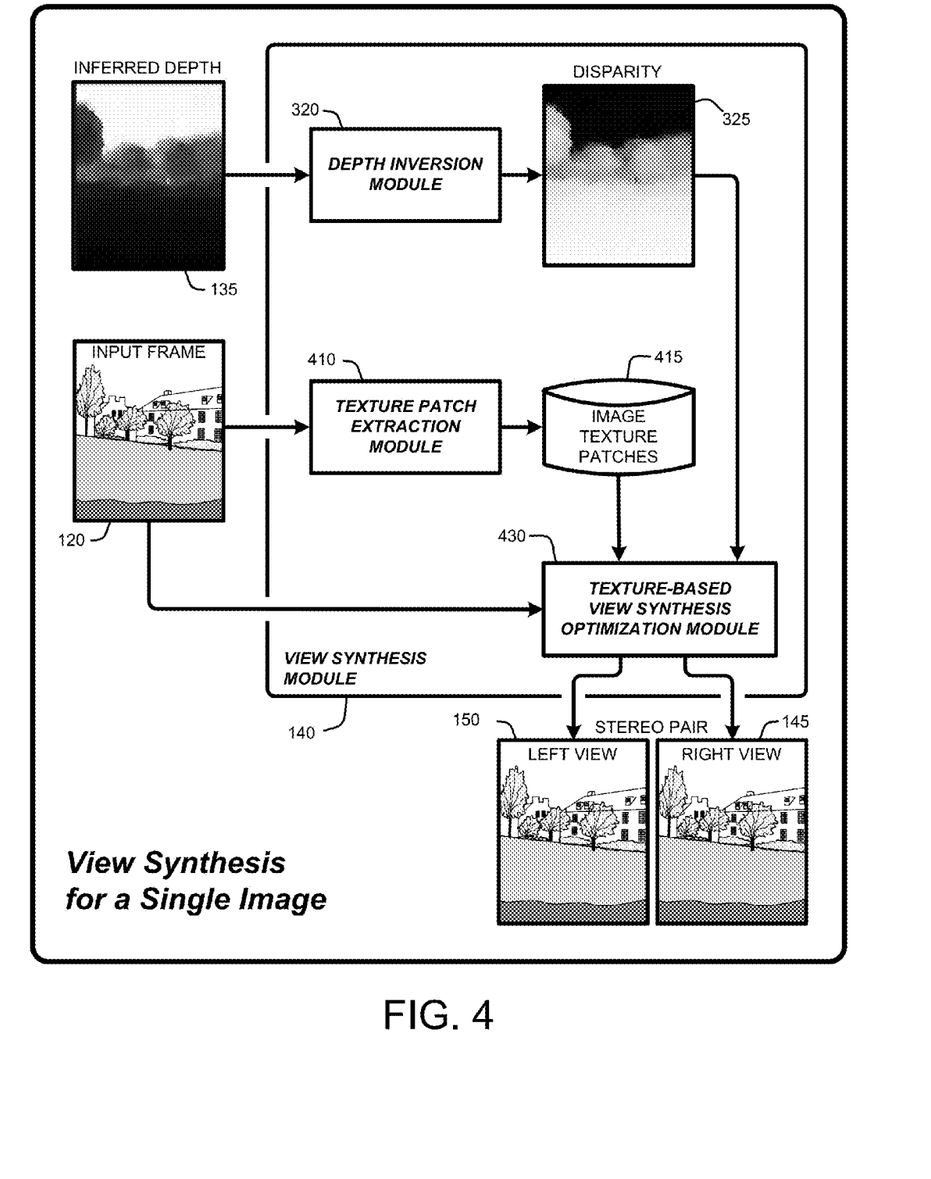
FIG. 4 provides an exemplary architectural flow diagram that expands upon an alternative implementation of the view synthesis module 140 of FIG. 1 and that further illustrates program modules for implementing various embodiments of the SVC, as described herein.

This further extension is illustrated by FIG. 4, which provides an exemplary architectural flow diagram that expands upon the view synthesis module 140 of FIG. 1 and that further illustrates program modules for implementing various embodiments of the SVC, as described herein. As illustrated by FIG. 4, each input frame 120 of the input video sequence is processed by a texture patch extraction module 410 component of the view synthesis module 140 to generate a database of texture priors, referred to herein as a database of image texture patches 415. This database is created by sampling small regions of each input frame 120.

Next, given the database of image texture patches 415, similar to the process illustrated by FIG. 3, the inferred depth 135 is provided to the depth inversion module 320 component of the view synthesis module 140. The depth inversion module inverts the inferred depth 135 to produce the disparity 325 for the input frame 120. Then, in contrast to the process illustrated by FIG. 3, the database of image texture patches 415 and the input frame 120 are provided to a texture-based view synthesis optimization module 430 component of the view synthesis module 140. As a result, video sequences processed by the view synthesis module 140 maintain coherence in the synthesized right view 145 and left view 150 relative to the original input frames.

2.5 Additional Extensions and Embodiments:

The preceding discussion generally focused on videos captured from a static viewpoint. However, in various embodiments, this idea is extensible to a more general class of video, such as, for example, translating or rotating viewpoints. In the case of camera translation, the SVC uses structure from motion (SfM) to compute robust (albeit sparse) depth estimates. The resulting SfM depths are then constrained to be unchanged during the optimization. Knowing even a few accurate depth measurements prior to optimization can greatly improve the entirety of the inferred depth. For a purely rotating camera, in various embodiments the SVC uses global motion estimation to improve motion segmentation for providing depth estimates for moving objects.

Global motion estimation can be done using point tracking and homography estimation (e.g., using RANdom SAmple Consensus, or RANSAC). Once the homographies have been computed, the sequence can then be stabilized, i.e., warped so that the background appear to be stationary. The size of the frame will need to be expanded to cover the range of camera motion. The stabilized sequence can then be treated as input as before. The main difference is there will be areas in stabilized video where there is no information due to camera motion, and these "blank" areas are ignored.

Furthermore, in the preceding discussion, the SVC assumed that depth discontinuities occur at image edges, and thus the smoothness weights in the depth optimization (i.e., Equation (4), $s_x, s_y$) are functions of image edges. However, it is more likely that depth discontinuities occur along occlusion boundaries. Consequently, in various embodiments, the SVC incorporates conventional estimates of occlusion boundaries in the smoothness weights.

Figure 5:
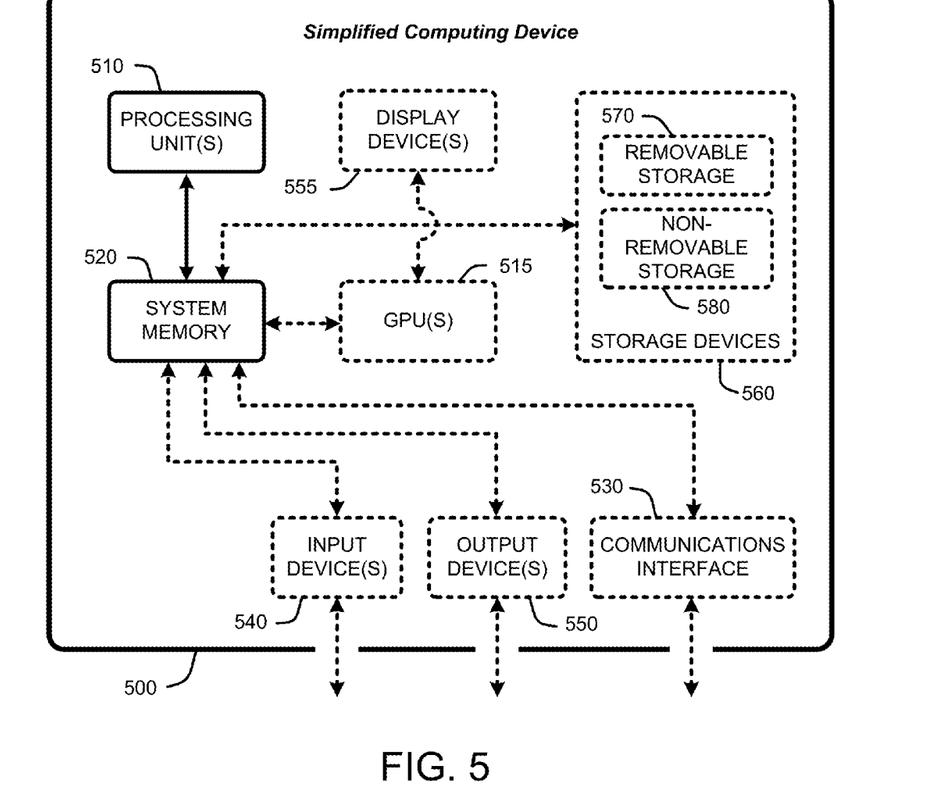
FIG. 5 is a general system diagram depicting a simplified general-purpose computing device having simplified computing and I/O capabilities for use in implementing various embodiments of the SVC, as described herein.

3.0 Exemplary Operating Environments:

The SVC described herein is operational within numerous types of general purpose or special purpose computing system environments or configurations. FIG. 5 illustrates a simplified example of a general-purpose computer system on which various embodiments and elements of the SVC, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device such as computer 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the SVC, the device should have a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the SVC described herein, or portions thereof, may be stored, received, transmitted, or read from any desired combination of computer or machine readable media or storage devices and communication media in the form of computer executable instructions or other data structures.

Finally, the SVC described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the SVC has been presented for the purposes of illustration and description. It is not intended to be exhaustive or to limit the claimed subject matter to the precise form disclosed. Many modifications and variations are possible in light of the above teaching. Furthermore, it should be noted that any or all of the aforementioned alternate embodiments may be used in any combination desired to form additional hybrid embodiments of the SVC. It is intended that the scope of the invention be limited not by this detailed description, but rather by the claims appended hereto.

What is claimed is:

1. A method for generating a stereoscopic view from a 2D image of a scene, comprising using a computing device to perform steps for:
    receiving a set of arbitrary images having known per-pixel depth information for one or more features in each of the arbitrary images;
    receiving one or more input images;
    for each of the input images, evaluating the set of arbitrary images to find one or more candidate images that are similar to each corresponding input image;
    estimating a per-pixel depth for each of the input images using the per-pixel depth information for features of the corresponding candidate images; and
    for each input image, synthesizing at least one new view corresponding to each input image from a combination of the input image and the corresponding estimated per-pixel depth information.

2. The method of claim 1 further comprising steps for constructing a stereoscopic view for each input image from each input image and each corresponding synthesized view.

3. The method of claim 1 wherein estimating a per-pixel depth for each of the input images further comprises warping each candidate image to each corresponding input image, and using corresponding per-pixel depth information of the warped candidate images to infer the estimated per-pixel depth for each input image.

4. The method of claim 3 wherein inferring the estimated per-pixel depth for each input image further comprises an iterative probabilistic optimization process that is initialized using a per-pixel average depth computed from the set of arbitrary images.

5. The method of claim 1 wherein synthesizing at least one new view corresponding to each input image further comprises considering each input image as a left view and synthesizing a corresponding right view for each input image by warping the left view into the right view using the estimated depth information of the input image.

6. The method of claim 1 wherein synthesizing at least one new view corresponding to each input image further comprises synthesizing a left view and a right view for each corresponding input image.

7. The method of claim 1 wherein synthesizing at least one new view corresponding to each input image further comprises steps for:
    inverting the estimated depth information for each input image to generate a disparity for each input image;
    identifying boundaries of salient regions in each input image using edge detection techniques; and
    selectively warping salient regions of each input image based on the estimated per-pixel depth information to synthesize the at least one new view.

8. The method of claim 5 wherein synthesizing the right view for each left view further comprises steps for:
    inverting the estimated depth information for each input image to generate a disparity for each input image;
    extracting one or more texture patches from each input image and synthesizing the right view such that on a local texture level, the synthesized right view looks similar to one or more of the extracted textures.

9. The system of claim 5 wherein synthesizing the right view for each left view further comprises steps for performing a joint estimation of depth and stereo that concurrently optimizes a highest probability right view given the corresponding left view and the estimated per-pixel depth in combination with a highest probability per-pixel depth given the given the corresponding left image.

10. A computer-implemented process for generating a perceptually plausible 3D video sequence from a 2D video sequence image of a scene, comprising:
    using a computer to perform process actions for:
    receiving a set of arbitrary images having known per-pixel depth information;
    receiving a 2D video sequence of a scene comprising two or more sequential input images;
    evaluating the set of set of arbitrary images to identify one or more candidate images that are similar to each corresponding input image;
    estimating a per-pixel depth for each input image from the per-pixel depth information of the corresponding candidate images by warping each candidate image to each corresponding input image, and using corresponding per-pixel depth information of the warped candidate images to infer the estimated per-pixel depth for each input image;
    synthesizing at least one new view corresponding to each input image from a combination of the input image and the corresponding estimated per-pixel depth; and
    constructing a perceptually plausible 3D video sequence corresponding to the 2D video sequence from each input image and each corresponding synthesized view.

11. The computer-implemented process of claim 10 wherein inferring the estimated per-pixel depth for each input image further comprises an iterative probabilistic optimization process that is initialized using a per-pixel average depth computed from the set of arbitrary images.

12. The computer-implemented process of claim 10 wherein synthesizing at least one new view corresponding to each input image further comprises considering each input image as a left view and synthesizing a corresponding right view for each input image by warping the left view into the right view using the estimated depth information of the input image.

13. The computer-implemented process of claim 10 wherein synthesizing at least one new view corresponding to each input image further comprises synthesizing a left view and a right view for each corresponding input image.

14. The computer-implemented process of claim 10 wherein synthesizing at least one new view corresponding to each input image further comprises:
    inverting the estimated depth information for each input image to generate a disparity for each input image;
    identifying boundaries of salient regions in each input image using edge detection techniques; and
    selectively warping salient regions of each input image based on the estimated per-pixel depth information to synthesize the at least one new view.

15. The computer-implemented process of claim 11 wherein synthesizing the right view for each left view further comprises:
    inverting the estimated depth information for each input image to generate a disparity for each input image;

extracting one or more texture patches from each input image and synthesizing the right view such that on a local texture level, the synthesized right view looks similar to one or more of the extracted textures.

16. A computer-readable storage device having computer executable instructions stored therein for generating perceptually plausible stereoscopic views of a 2D scene, said instructions comprising:
  receiving a set of arbitrary images having known per-pixel depth information;
  receiving a 2D video sequence of a scene comprising two or more sequential input images;
  evaluating the set of set of arbitrary images to identify one or more candidate images that are similar to each corresponding input image;
  estimating a per-pixel depth for each input image from the per-pixel depth information of the corresponding candidate images by warping each candidate image to each corresponding input image, and using corresponding per-pixel depth information of the warped candidate images to infer the estimated per-pixel depth for each input image;
  synthesizing at least one new view corresponding to each input image from a combination of the input image and the corresponding estimated per-pixel depth; and
  constructing a perceptually plausible 3D version of the 2D video sequence from each input image and each corresponding synthesized view.

17. The computer-readable storage device of claim 16 wherein inferring the estimated per-pixel depth for each input image further comprises an iterative probabilistic optimization process that is initialized using a per-pixel average depth computed from the set of arbitrary images.

18. The computer-readable storage device of claim 16 wherein synthesizing at least one new view corresponding to each input image further comprises considering each input image as a left view and synthesizing a corresponding right view for each input image by warping the left view into the right view using the estimated depth information of the input image.

19. The computer-readable storage device of claim 16 wherein synthesizing at least one new view corresponding to each input image further comprises:
  inverting the estimated depth information for each input image to generate a disparity for each input image;
  identifying boundaries of salient regions in each input image using edge detection techniques; and
  selectively warping salient regions of each input image based on the estimated per-pixel depth information to synthesize the at least one new view.

20. The computer-readable storage device of claim 16 wherein synthesizing the right view for each left view further comprises:
  inverting the estimated depth information for each input image to generate a disparity for each input image;
  extracting one or more texture patches from each input image and synthesizing the right view such that on a local texture level, the synthesized right view looks similar to one or more of the extracted textures.

\* \* \* \* \*